US012520379B2

(12) United States Patent
Ma et al.

(10) Patent No.: US 12,520,379 B2
(45) Date of Patent: Jan. 6, 2026

(54) MULTICAST AND BROADCAST SERVICE ESTABLISHMENT

(71) Applicant: ZTE Corporation, Guangdong (CN)

(72) Inventors: Zijiang Ma, Shenzhen (CN); Yin Gao, Shenzhen (CN); Tao Qi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 386 days.

(21) Appl. No.: 18/160,068

(22) Filed: Jan. 26, 2023

(65) Prior Publication Data

US 2023/0171845 A1     Jun. 1, 2023

Related U.S. Application Data

(63) Continuation of application No. PCT/CN2020/106524, filed on Aug. 3, 2020.

(51) Int. Cl.
*H04W 76/12*     (2018.01)
*H04W 76/40*     (2018.01)

(52) U.S. Cl.
CPC ........... *H04W 76/40* (2018.02); *H04W 76/12* (2018.02)

(58) Field of Classification Search
None
See application file for complete search history.

(56) References Cited

U.S. PATENT DOCUMENTS

| 2013/0170357 | A1 | 7/2013 | Anchan et al. |
| 2018/0331948 | A1* | 11/2018 | Jiang ................... H04L 12/4641 |
| 2019/0132150 | A1* | 5/2019 | Ramachandran ... H04L 12/4633 |

(Continued)

FOREIGN PATENT DOCUMENTS

| CN | 101420761 A | * | 4/2009 |
| CN | 101595741 A | | 12/2009 |

(Continued)

OTHER PUBLICATIONS

Extended European Search Report for European Patent Application No. 20947832.0, mailed Aug. 24, 2023 (6 pages).

(Continued)

*Primary Examiner* — Lakeram Jangbahadur
(74) *Attorney, Agent, or Firm* — Perkins Coie LLP (57) ABSTRACT

Methods, apparatus, and systems that establish Multicast and Broadcast Service sessions based on existing tunnels between the core network and radio access nodes are disclosed. In one example aspect, a wireless communication method includes receiving, by a first communication node, a request from a core network node to establish a session. The request comprises a list of tunnels established between the core network node and other communication nodes to provide multicast and broadcast service. The method includes selecting, by the first communication node, a channel from the list of tunnels included in the request to establish a multicast and broadcast session that corresponds to the session. The method also includes transmitting, by the first communication node to the core network node, a response indicating an establishment of the session. The response includes information associated with the selected channel between the second communication node and the core network node.

16 Claims, 9 Drawing Sheets

(56) References Cited

U.S. PATENT DOCUMENTS

2021/0392469 A1* 12/2021 Wang .................. H04L 12/4641

FOREIGN PATENT DOCUMENTS

CN            102821359 A     12/2012
CN            106230730 A     12/2016

OTHER PUBLICATIONS

Secretary of SA WG2, "Draft Report of SA WG2 meetings #129BIS," SA WG2 Meeting #S2-130, S2-1900002, Nov. 2018-Jan. 2019 (644 pages).
International Search Report and Written Opinion for International Application No. PCT/CN2020/106524, mailed on Apr. 25, 2021 (9 pages).
Alcatel-Lucent, "Introduction of TOF as a logical node," 3GPP TSG-RAN3 Meeting #69bis, R3-103074, Xi An, China, Oct. 11-15, 2010 (56 pages).
Office Action for Chinese Patent Application No. 202080102805.0, mailed Aug. 30, 2024 (12 pages).
First Examination Report for Indian Patent Application No. 202317005691, mailed Sep. 30, 2024 (6 pages).

* cited by examiner

MULTICAST AND BROADCAST SERVICE ESTABLISHMENT

CROSS REFERENCE TO RELATED APPLICATIONS

This patent document is a continuation of and claims benefit of priority to International Patent Application No. PCT/CN2020/106524, filed on Aug. 3, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that enable a Radio Access Network (RAN) node to establish a Multicast and Broadcast Service (MBS) session using an existing tunnel that has been established between the core network and another RAN node, thereby improving load balancing among the RAN nodes and reducing signaling overhead associated with mobile devices in mobility scenarios.

In one example aspect, a wireless communication method is disclosed. The method includes receiving, by a first communication node, a request from a core network node to establish a communication session. The request comprises a list of tunnels established between the core network node and other communication nodes to provide multicast and broadcast service. The method includes selecting, by the first communication node, a channel from the list of tunnels included in the request to establish a multicast and broadcast session that corresponds to the communication session. The method also includes transmitting, by the first communication node to the core network node, a response indicating an establishment of the communication session. The response includes information associated with the selected channel between the second communication node and the core network node.

In another example aspect, a wireless communication method is disclosed. The method includes transmitting, by a core network node, a request to a first communication node to establish a communication session. The request comprises a list of tunnels established between the core network node and other communication nodes to provide multicast and broadcast service. The method also includes receiving, by the core network node, a response indicating an establishment of the communication session. The response includes information associated with a channel between a second communication node and the core network node selected from the list of tunnels.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Figure 1:
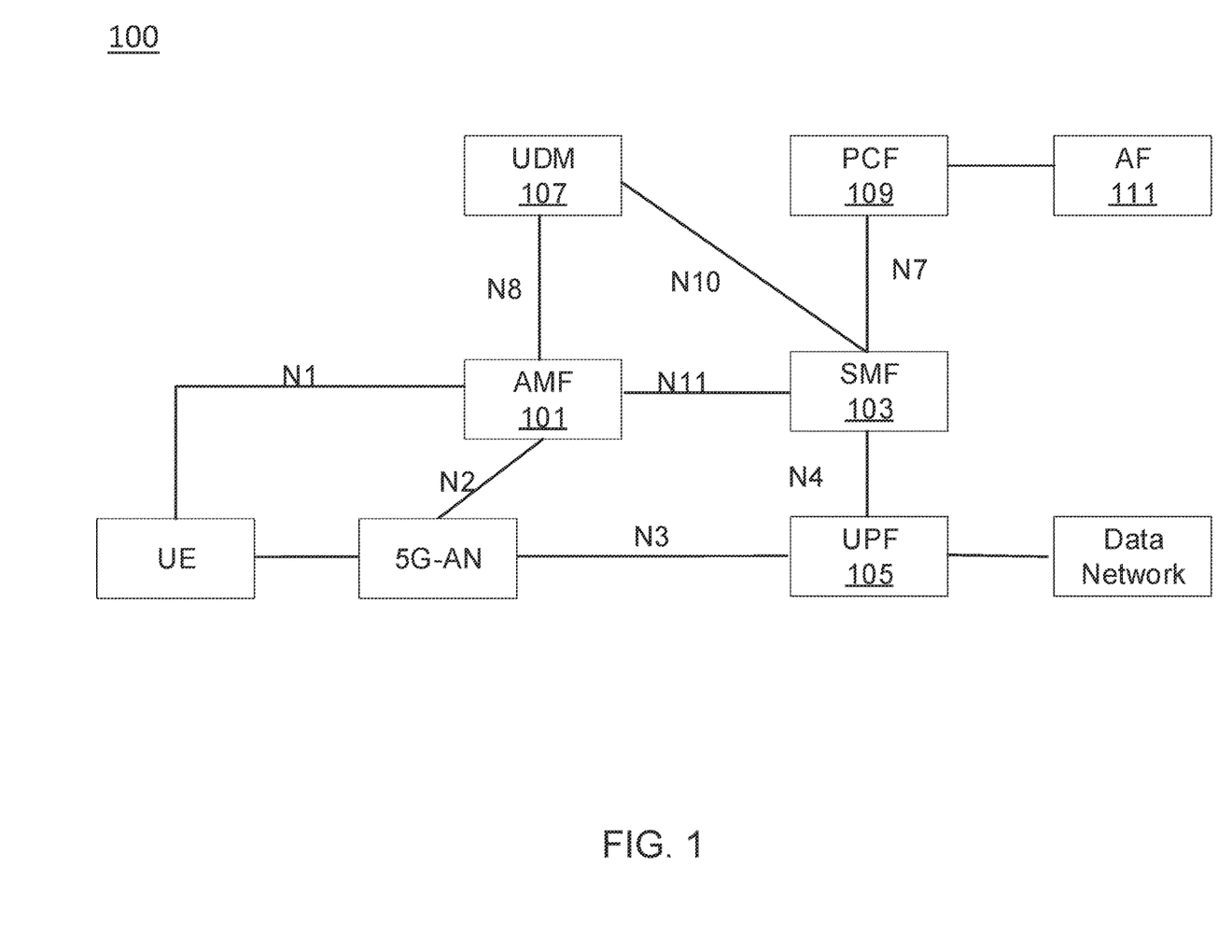
FIG. 1 illustrates an example architecture of a Fifth Generation (5G) system.

In telecommunications, 5G is the fifth-generation technology standard for cellular networks to provide connectivity to wireless communication devices. The 5G communication systems provide many network functions. FIG. 1 illustrates an example architecture 100 of a 5G system. The illustrated architecture 100 includes the following network functions:

1. The Access and Mobility Management function (AMF) 101. The AMF 101 is responsible for User Equipment (UE) mobility management, reachability management, and/or connection management, etc. The AMF terminates the Radio Access Network (RAN) Control Plane (CP) N2 interface and the Non-Access Stratum (NAS) N1 interface. It also distributes the Session Manager (SM) NAS to the proper Session Management Functions (SMFs) via the N11 interface.

2. The Session Management function (SMF) 103. The SMF 103 is responsible for UE Internet Protocol (IP) address allocation and management, selection and control of User Plane (UP) function, and/or Protocol Data Unit (PDU) connection management, etc.

3. The User plane function (UPF) 105. The UPF 105 is the anchor point for Intra-/Inter-RAT mobility and the external PDU session point of interconnect to data networks. The UPF also routes and forwards the data packet as the indication from the SMF. The UPF 105 buffers the downlink data when the a is in the idle mode.

4. The Unified Data Management (UDM) 107. The UDM 107 manages subscription profiles for the UEs. Subscription data includes data used for mobility management (e.g. restricted area), session management (e.g. Quality of Service profile per slice per Data Network Name). The subscription data also includes the slice selection parameters which is used for AMF to select a proper SMF 103. The AMF 101 and SMF 103 get the subscription data from the UDM 107. The subscription data is stored in the Unified Data Repository (UDR) (not shown). The UDM 107 uses such data upon reception of request from AMF 101 or SMF 103.

5. The Policy Control Function (PCF) 109. The PCF 109 generates the policy to govern network behavior based on the subscription and indication from Application Function (AF) 111. It also provides policy rules to CP functions (e.g., AMF 101 and/or SMF 103) for enforcement. The PCF can access the UDR to retrieve the policy data.

6. The Network Exposure Function (NEF) (not shown). The NEF is deployed optionally for exchanging information between the 5G core network (also referred to as 5GC) and the external third party. In this case, the AF 111 can store the application information in the UDR via NEF.

Figure 2:
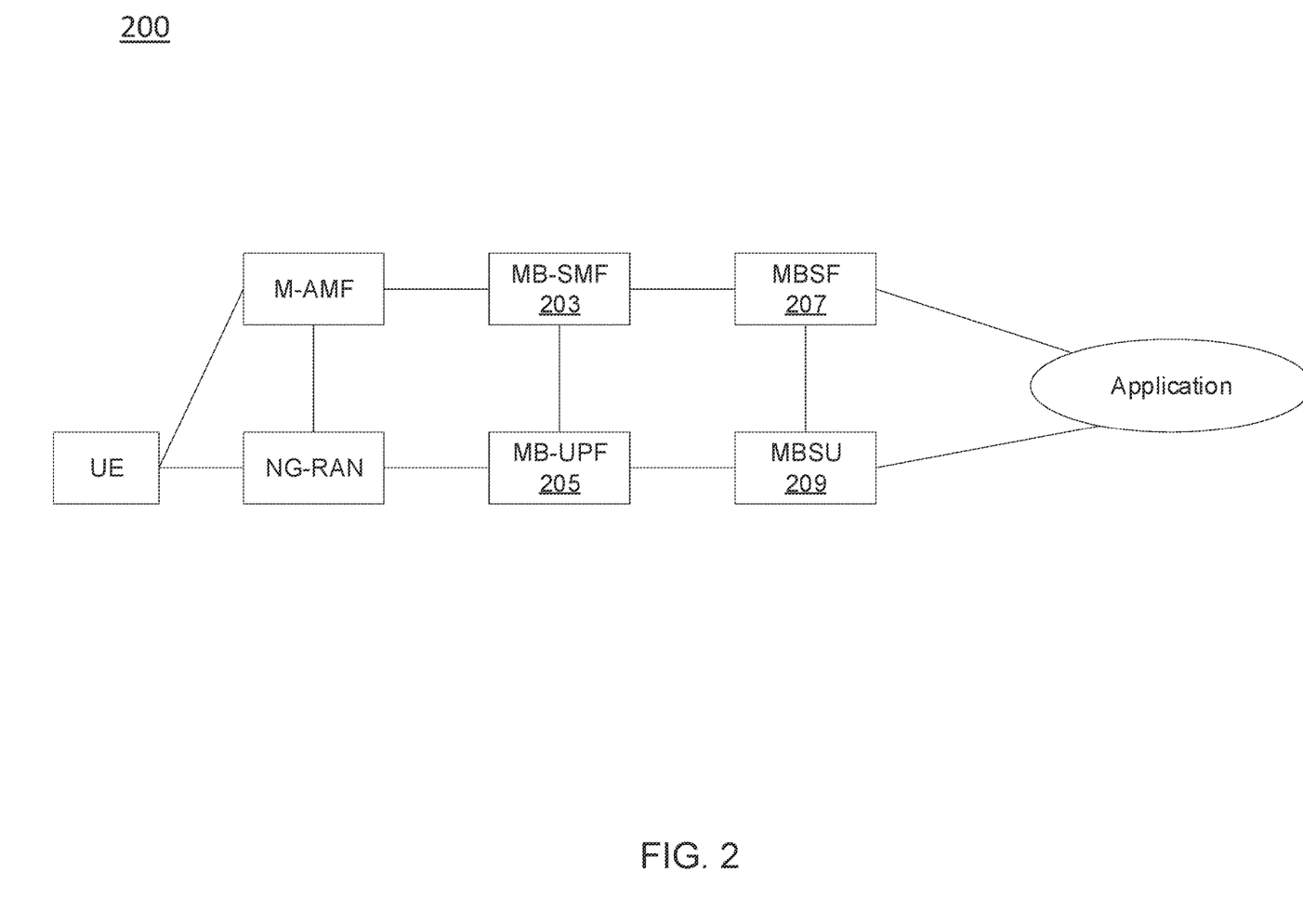
FIG. 2 illustrates an example architecture for providing multicast and broadcast services.

With the development of 5G technology, 5G communication systems can provide multicast-broadcast services for different businesses related to public safety, autonomous driving, and/or Internet of Things (IoT). FIG. 2 illustrates an example architecture for providing multicast and broadcast services. The illustrated architecture 200 includes network functions such as the Multicast/Broadcast SMF (MB-SMF) 203 and/or the Multicast/Broadcast UPF (MB-UPF) 205 that are enhanced to support the multicast/broadcast service. The architecture 200 also includes the following network functions:

1. The Multicast/Broadcast Service Function (MBSF) 207. The MBSF 207 is a new Network Function to manage signaling for the service layer capability. It also provides an interface to the Application Server or content provider.

2. The Multicast/Broadcast Service User Plane (MBSU) 209. The MBSU 209 is new entity to manage the payload data for the service layer capability. The MBSU 209 can be a standalone entity or collocated with MBSF or MB-UPF.

Figure 3:
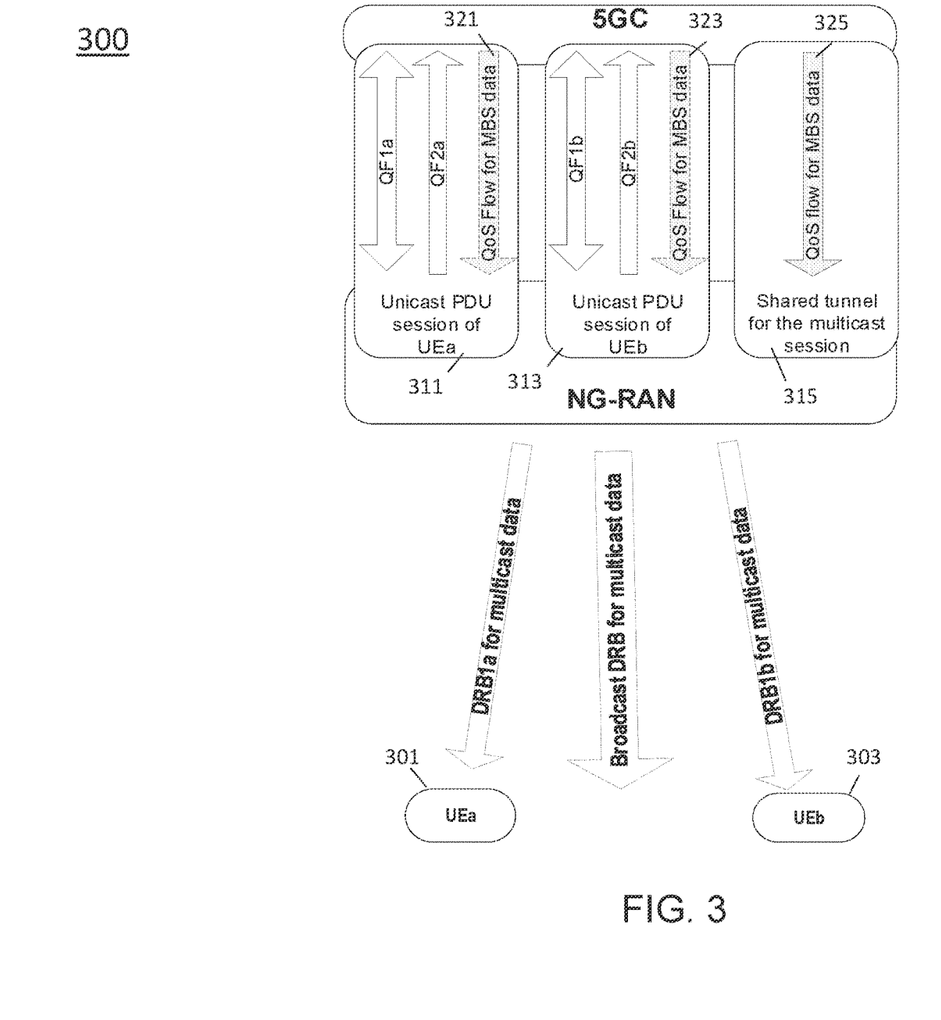
FIG. 3 illustrates an example of transmitting multicast service data from the 5G core network to a New Generation Radio Access Network (NG-RAN) node in accordance with the present technology.

FIG. 3 illustrates an example of transmitting multicast service data from the 5GC to a New Generation Radio Access Network (NG-RAN) node in accordance with the present technology. A Multicast/Broadcast service (MBS) includes one or more MBS Quality of Service (QoS) flows. After a UE has successfully joins an MBS, the 5GC can initiate establishment of the MBS QoS flow(s) for this UE. Two scenarios are described below:

1. For each joined UE, the MBSF triggers the MB-SMF to establish one or more multicast QoS flows in a PDU Session. The PDU session can be an existing PDU session, and the 5GC initiates a PDU session modification procedure. The PDU session can also be a new PDU Session established in a PDU session setup procedure by the 5GC. The QoS flows can be bound with a UE-specific unicast tunnel. The user data in these QoS flows can be transmitted from 5GC to UE via the NG-RAN. When multiple UEs join the same MBS, the 5GC can establish a UE-specific unicast tunnel for each UE to transmit data in the QoS flow(s). For example, as shown in FIG. 3, a unicast PDU session 311 is established for UEa 301, and a unicast PDU session 313 is established for UEb 303. The QoS flow 321 for MBS user data for UEa 301 can be bound with the unicast tunnel 311. The QoS flow 323 for MBS user data for UEb 303 can be bound with the unicast tunnel 313. The unicast tunnel can be configured with a QoS flow identify (QFI) that is included an encapsulation header of each user data packet.

2. Alternatively, or in addition, a shared tunnel can be established for all UEs that join the MBS when the 5GC decides to transmit user data using the multicast mode. The MBSF can trigger the MB-SMF to establish a shared multicast tunnel 315 for all the UEs in the same NG-RAN node. For example, the QoS flow 325 for MBS user data for other UEs can be bound with the shared multicast tunnel 315. The multicast QoS flow(s) can be configured with the MBS identity, such as the Temporary Mobile Group Identity (TMGI), session identify (ID), a special QoS flow ID. The MBS identity can be included in an encapsulation header of each user data packet.

The QoS flow(s) can be bound with a unicast tunnel for each UE or be bound with the shared multicast tunnel. If both the UE-specific unicast tunnel and the shared multicast tunnel are configured, it is more desirable to transmit the MBS user data on the shared tunnel. In some cases, the unicast tunnel may become a dummy tunnel with no MBS user data transmission.

Figure 4:
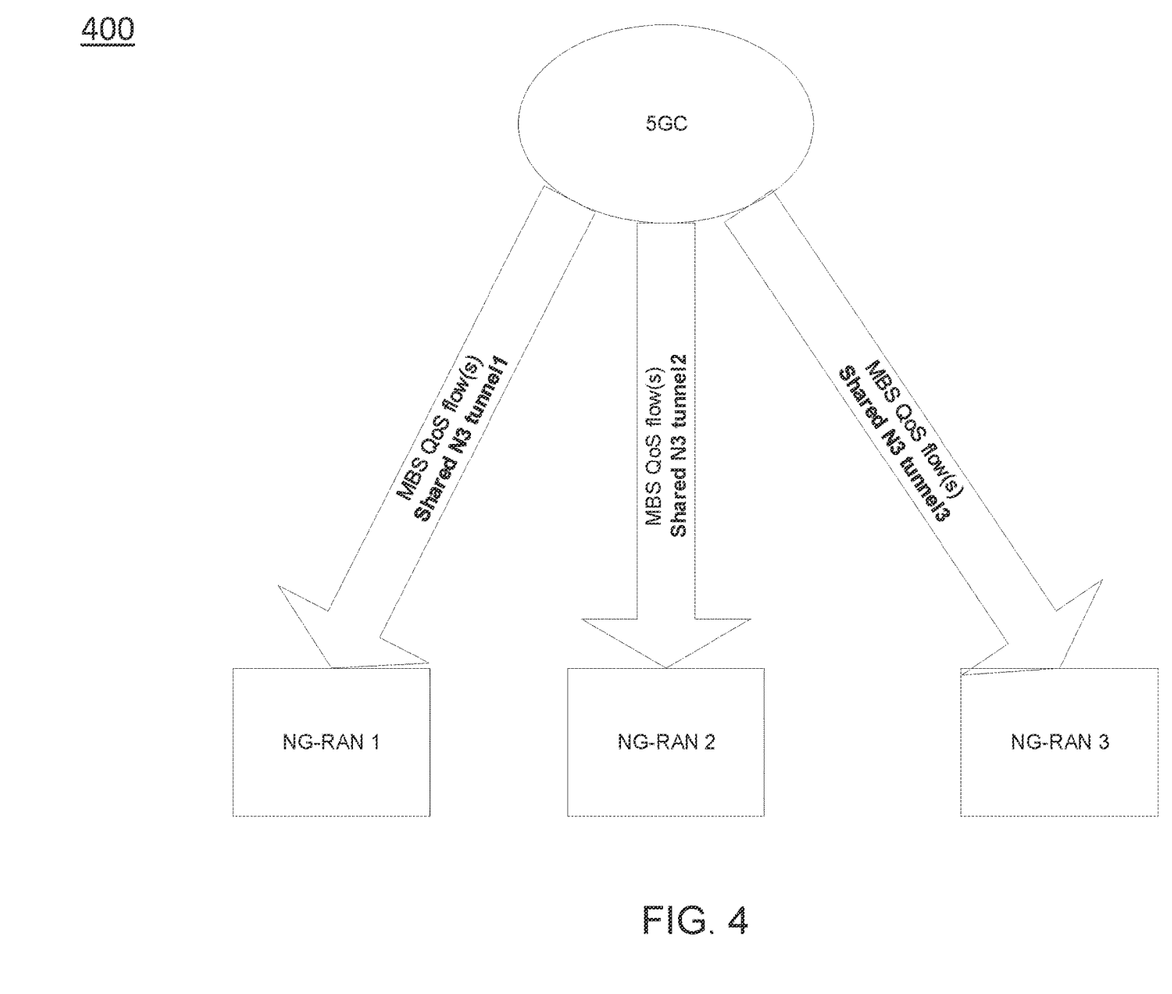
FIG. 4 illustrates a 5G network deployment 400 for Multicast and Broadcast Services (MBSs) in accordance with the present technology.

FIG. 4 illustrates a 5G network deployment 400 for Multicast and Broadcast Services (MBSs) in accordance with the present technology. As shown in FIG. 4, the 5GC (e.g., the UPF) establishes an N3 tunnel with each NG-RAN node. A UE can camp on a cell that belongs to an NG-RAN1 when the network allows the UE to join an MBS service that includes the one or more MBS QoS flows. If the MBS service has been established for the NG-RAN1 node, the NG-RAN1 node already has a multicast/shared N3 tunnel used for transmitting user data for the MBS service. There is no need for the 5GC to establish the N3 tunnel again the UE. However, if the multicast/shared N3 tunnel has not been established for the NG-RAN1 node, the 5GC establishes the tunnel so that user data of the MBS service can be transmitted to the UE from a network node (e.g., the UPF). A shared tunnel includes at least a tunnel identifier and a downlink (DL) address anchored at the corresponding RAN node. For example, the three shared tunnels in FIG. 4 have different tunnel IDs and different DL addresses to allow user data to be transmitted to NG-RAN1, NG-RAN2, and NG-RAN3 separately.

With the development of wireless communication technology, a UE can achieve dual-connectivity by establishing two connections with two different RAN nodes. Dual connectivity allows the UE to aggregate data streams and improve UE's mobility. This patent document discloses techniques that can be implemented in various embodiments to allow two RAN nodes to use a same tunnel (e.g., a UE-specific unicast or a shared multicast tunnel) for MBS user data transmissions, thereby enabling load balancing between the RAN nodes. The disclosed techniques are applicable to dual-connectivity scenarios as well as single connectivity scenarios. For example, the disclosed techniques can be applied to reduce signaling overhead when UE mobility occurs between the two RAN nodes to eliminate the need for switching anchor node and/or hand-over procedure.

Figure 5:
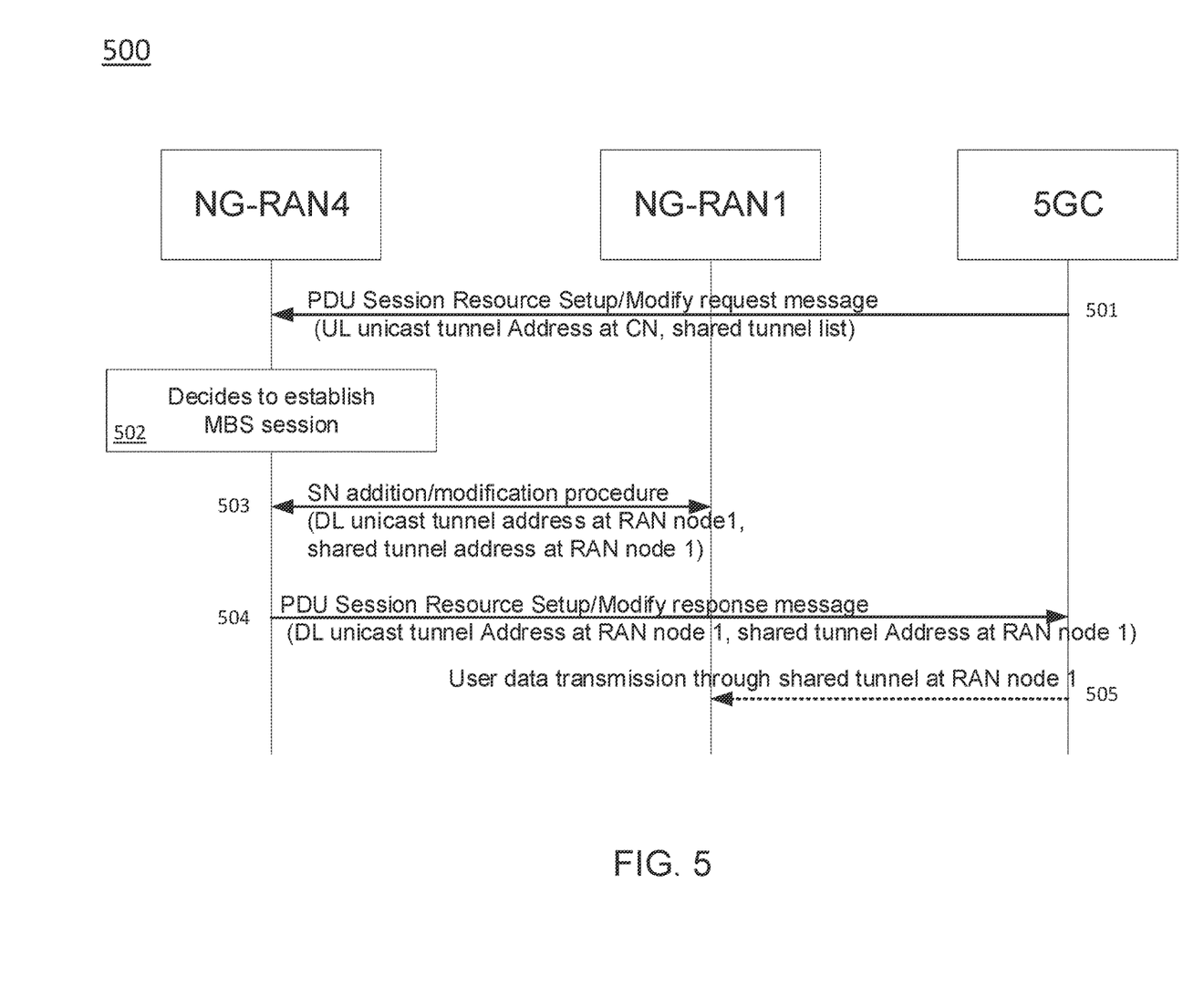
FIG. 5 illustrates an example signaling sequence in accordance with the present technology.

FIG. 5 illustrates an example signaling sequence 500 in accordance with the present technology. A UE that is connected the NG-RAN1 node (e.g., as shown in FIG. 4) can establish a new connection with a NG-RAN4 node to achieve dual connectivity. The UE wants to join an MBS that includes one or more MBS QoS flows. A tunnel has already been established between the NG-RAN1 node and the 5GC (e.g., a UE-specific unicast tunnel or a shared N3 tunnel). However, there is no existing tunnel between the NG-RAN4 node and the 5GC. The following operations can be performed to enable the NG-RAN4 to establish or use a tunnel for transmitting MBS user data.

Operation 501: The core network (e.g., 5GC, or UPF/AMP in the 5GC) transmits a request message to the NG-RAN4 node for establishing a session after the core network receives an establishment request from the UE (e.g., when the UE moves into the coverage area of the NG-RAN4 node). The request message can be a PDU Session Resource Setup request message, a PDU Session Resource Modify request message, or a new type of request message.

The request message can include information about one or more unicast PDU sessions to be established for the UE(s) (e.g., as shown in FIG. 3). The request message includes the uplink (UL) unicast tunnel address of the core network node to allow the establishment of the unicast PUD session(s). For each unicast PDU session, a corresponding MBS session (that is, a mapped MBS session) can be established accordingly. The request message can include the mapping information between the PDU unicast session and the MBS session. Each UE-specific PDU session includes one or more QoS flows that are associated with the UE-specific PDU session context. Information about a UE-specific PDU session can include at least the PDU Session ID, a list of QoS flow(s), and information for a unicast user data tunnel.

The request message can further include a list of tunnels already established between the core network and other RAN nodes. Each of the tunnels in the list of shared tunnels is identified by a dedicated tunnel ID. For example, the list can include the following information: TunnelID1→{CN, NG-RAN1}, TunnelID2→{CN, NG-RAN2}, and TunnelID3→{CN, NG-RAN3}.

Operation 502: After receiving the request message from the core network, the NG-RAN4 node determines how the MBS session admitted is to be established. The NG-RAN4 node can determine that the MBS session is to be established between the core network and itself. In some cases, the NG-RAN4 node may find that it already carries a heavy load. In order to achieve better load balancing, the NG-RAN4 node can determine, based on the list of shared tunnels already established between the core network and other RAN nodes, that the MBS session is to be established using one of the existing tunnels, thereby reducing and/or eliminating the extra load that comes with establishing a new tunnel.

Operation 503: If the NG-RAN4 node determines to establish the MBS session using an existing tunnel (e.g., TunnelID1→{CN, NG-RAN1}), the NG-RAN4 node can initiate a procedure with the NG-RAN1 node to notify the NG-RAN1 node of the MBS session. The procedure can be a Secondary Node (SN) addition procedure or an SN modification procedure. The notification can help the NG-RAN1 node release the tunnel/session at appropriate times. For example, NG-RAN1's tunnel initially includes five QoS flows for five UEs respectively. After the five UEs leave the coverage area of the NG-RAN1 node, the tunnel should still be maintained by the NG-RAN1 as it is used by the NG-RAN4 node for MBS user data transmissions. Furthermore, the NG-RAN1 node can inform the NG-RAN4 node of the downlink unicast tunnel address and/or the shared tunnel address at the NG-RAN1 node.

Operation 504: The NG-RAN4 node sends a response message to the core network in response to the request message received in Operation 501. The response message can be a PDU Session Resource Setup response message, a PDU Session Resource Modify response message, or a new type of response message. The NG-RAN4 node reports the downlink unicast tunnel address and/or the share tunnel address of the NG-RAN1 node to allow the core network to route MBS session user data via the NG-RAN1 node.

Operation 505: The core network now transmits user data to the NG-RAN4 node via the tunnels of the NG-RAN1. In some embodiments, the NG-RAN4 only reports the unicast tunnel address of the NG-RAN1 to the core network. Subsequently, the NG-RAN4 can receive user data via the unicast user data tunnel of NG-RAN1. In some embodiments, the NG-RAN4 reports the shared tunnel address of the NG-RAN1, or both the unicast and shared multicast tunnel addresses of the NG-RAN1, to the core network. Subsequently, the NG-RAN4 can receive user data via the shared multicast tunnel of NG-RAN1 as it is more desirable to use the shared channel when it is available.

In some embodiments, the UE can be dual-connected to both NG-RAN1 and NG-RAN4. In some embodiments, the UE is connected to NG-RAN4 only. However, the NG-RAN4 can still leverage existing tunnels (e.g., tunnels of neighboring RAN nodes) to transmit MBS user data, thereby improve UE mobility handling. For example, when the UE moves from NG-RAN4 to NG-RAN1, using NG-RAN1's tunnel for MBS user data transmission can eliminate the need for anchor node switching or hand-over procedures.

Figure 6:
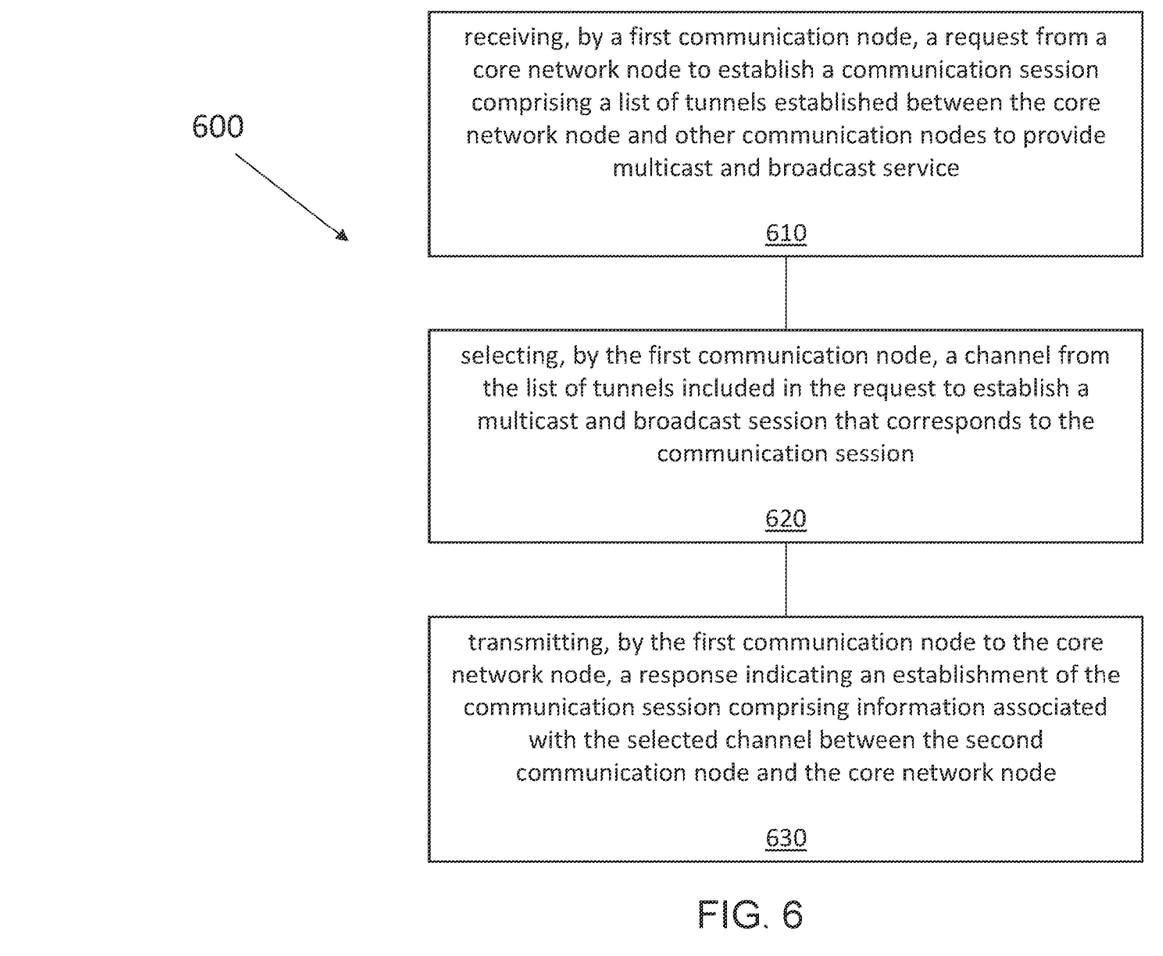
FIG. 6 is a flowchart representation of a method for wireless communication in accordance with the present technology.

FIG. 6 is a flowchart representation of a method 600 for wireless communication in accordance with the present technology. The method 600 includes, at operation 610, receiving, by a first communication node (e.g., NG-RAN4 as shown in FIG. 5), a request from a core network node to establish a communication session. The request comprises a list of tunnels established between the core network node and other communication nodes to provide multicast and broadcast service. The method 600 includes, at operation 620, selecting, by the first communication node, a channel from the list of tunnels included in the request to establish a multicast and broadcast session that corresponds to the communication session. The method 600 also includes, at operation 630, transmitting, by the first communication node to the core network node, a response indicating an establishment of the communication session. The response comprises information associated with the selected channel between the second communication node and the core network node.

In some embodiments, the communication session comprises a Protocol Data Unit (PDU) session that is specific to a mobile device. In some embodiments, the mobile device is dual-connected with the first communication node and the second communication node. In some embodiments, each tunnel in the list of tunnels is identified by a dedicated tunnel identifier.

In some embodiments, the method includes receiving, by the first communication node from the second communication node, at least one of: a unicast tunnel address of the second communication node or a multicast tunnel address of the second communication node. In some embodiments, the information associated with the selected channel between the second communication node and the core network node comprises at least one of: the unicast tunnel address of the second communication node or the multicast tunnel address of the second communication node. In some embodiments, the method further includes receiving, by the first communication node, data for the multicast and broadcast session from the core network node via the second communication node.

Figure 7:
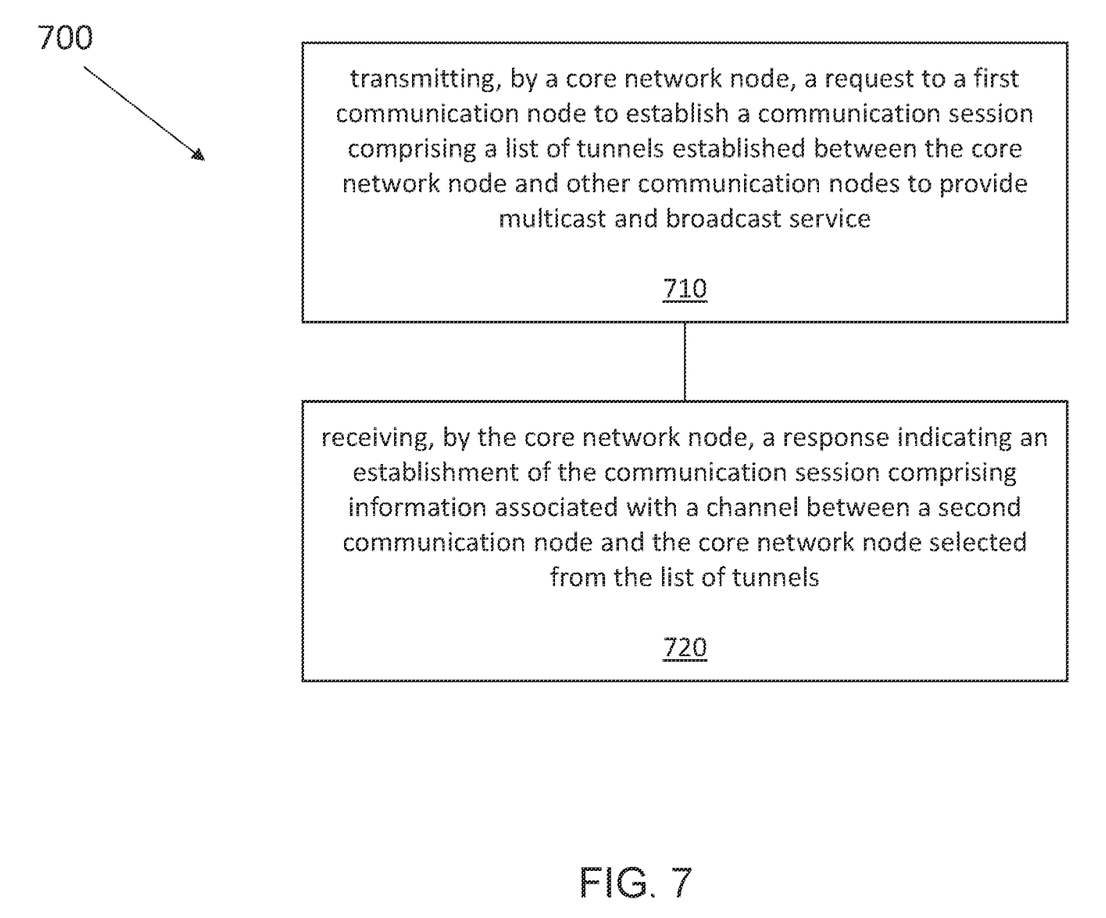
FIG. 7 is a flowchart representation of another method for wireless communication in accordance with the present technology.

FIG. 7 is a flowchart representation of a method 700 for wireless communication in accordance with the present technology. The method 700 includes, at operation 710, transmitting, by a core network node, a request to a first communication node to establish a communication session. The request comprises a list of tunnels established between the core network node and other communication nodes to provide multicast and broadcast service. The method 700 includes, at operation 720, receiving, by the core network node, a response indicating an establishment of the communication session. The response includes information associated with a channel between a second communication node and the core network node selected from the list of tunnels.

In some embodiments, the communication session comprises a Protocol Data Unit (PDU) session that is specific to a mobile device. In some embodiments, the mobile device is dual-connected with the first communication node and the second communication node. In some embodiments, each tunnel in the list of tunnels is identified by a dedicated tunnel identifier.

In some embodiments, the information associated with the channel between the second communication node and the core network node comprises at least one of: a unicast tunnel address of the second communication node or a multicast tunnel address of the second communication node. In some embodiments, the method further includes transmitting, by the core network node, data for the multicast and broadcast to the first communication node via the second communication node.

Figure 8:
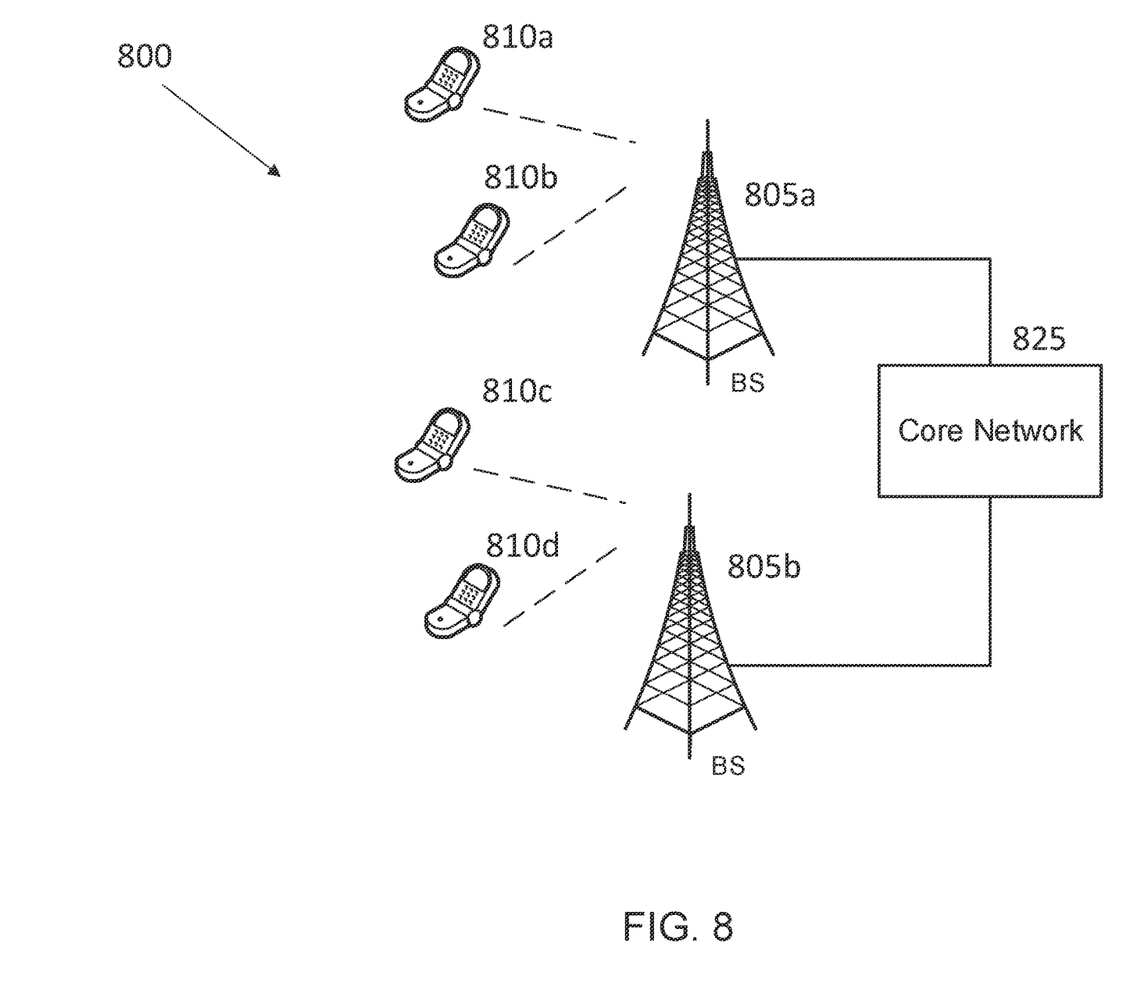
FIG. 8 shows an example of a wireless communication system where techniques in accordance with one or more embodiments of the present technology can be applied.

FIG. 8 shows an example of a wireless communication system 800 where techniques in accordance with one or more embodiments of the present technology can be applied. A wireless communication system 1200 can include one or more base stations (BSs) 805a, 805b, one or more wireless devices 810a, 810b, 810c, 810d, and a core network 825. A base station 805a, 805b can provide wireless service to wireless devices 810a, 810b, 810c and 810d in one or more wireless sectors. In some implementations, a base station 805a, 805b includes directional antennas to produce two or more directional beams to provide wireless coverage in different sectors.

The core network 825 can communicate with one or more base stations 805a, 805b. The core network 825 provides connectivity with other wireless communication systems and wired communication systems. The core network may include one or more service subscription databases to store information related to the subscribed wireless devices 810a, 810b, 810c, and 810d. A first base station 805a can provide wireless service based on a first radio access technology, whereas a second base station 805b can provide wireless service based on a second radio access technology. The base stations 805a and 805b may be co-located or may be separately installed in the field according to the deployment scenario. The wireless devices 810a, 810b, 810c, and 810d can support multiple different radio access technologies. The techniques and embodiments described in the present document may be implemented by the base stations of wireless devices described in the present document.

Figure 9:
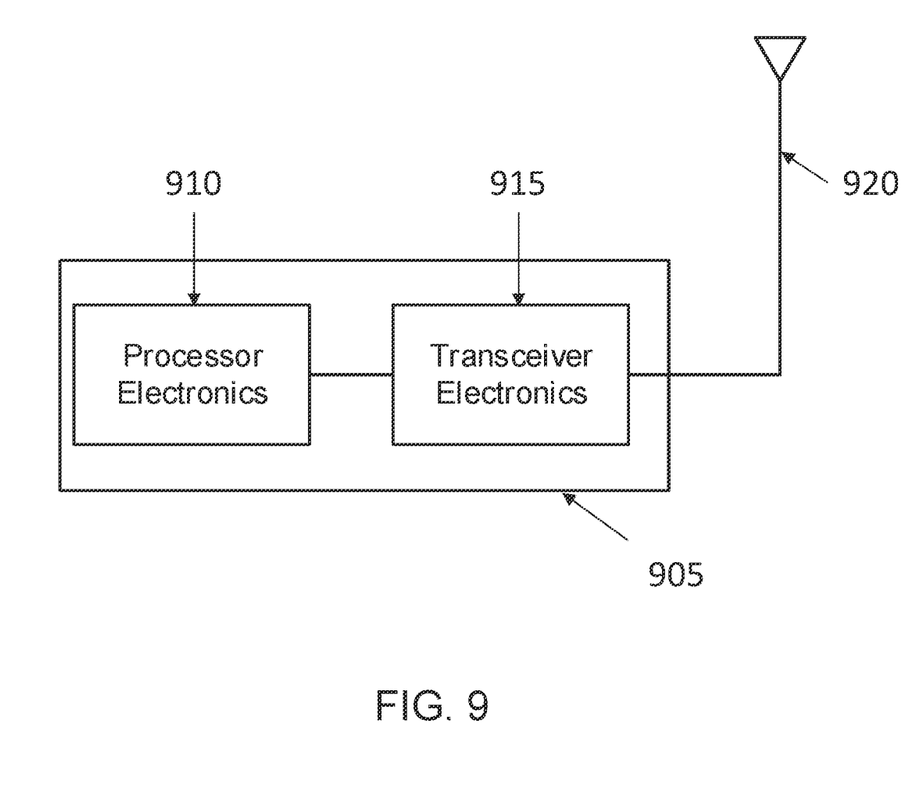
FIG. 9 is a block diagram representation of a portion of a radio station in accordance with one or more embodiments of the present technology can be applied.

FIG. 9 is a block diagram representation of a portion of a radio station in accordance with one or more embodiments of the present technology can be applied. A radio station 905 such as a base station or a wireless device (or wireless device) can include processor electronics 910 such as a microprocessor that implements one or more of the wireless techniques presented in this document. The radio station 905 can include transceiver electronics 915 to send and/or receive wireless signals over one or more communication interfaces such as antenna 920. The radio station 905 can include other communication interfaces for transmitting and receiving data. Radio station 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the radio station 905. In some embodiments, the radio station 905 may be configured to perform the methods described herein.

It will be appreciated that the present document discloses techniques that can be embodied in various embodiments to improve load balancing among the RAN nodes and reduce signaling mobility associated with the mobile devices in mobility scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
receiving, by a first communication node, a request from a core network node to establish a communication session, wherein the request comprises a list of tunnels established between the core network node and other communication nodes to provide multicast and broadcast service;
selecting, by the first communication node, a tunnel from the list of tunnels included in the request to establish a multicast and broadcast session that corresponds to the communication session, wherein each tunnel in the list of tunnels is identified by a dedicated tunnel identifier; and
receiving, by the first communication node from a communication node, at least one of: a unicast tunnel address of the second communication mode or a multicast tunnel address of the second communication node, wherein information associated with the tunnel between the second communication node and the core network node comprises at least one of the unicast tunnel address of the second communication node or the multicast tunnel address of the second communication node; and
transmitting, by the first communication node to the core network node, a response indicating an establishment of the communication session, the response comprising the information associated with the tunnel between the second communication node and the core network node.

2. The method of claim 1, wherein the communication session comprises a Protocol Data Unit (PDU) session that is specific to a mobile device.

3. The method of claim 2, wherein the mobile device is dual-connected with the first communication node and the second communication node.

4. The method of claim 1, further comprising:
receiving, by the first communication node, data for the multicast and broadcast session from the core network node via the second communication node.

5. A method for wireless communication, comprising:
transmitting, by a core network node, a request to a first communication node to establish a communication session, wherein the request comprises a list of tunnels established between the core network node and other communication nodes to provide multicast and broadcast service, wherein each tunnel in the list of tunnels is identified by a dedicated tunnel identifier; and
receiving, by the core network node, a response indicating an establishment of the communication session, the response comprising information associated with a tunnel between a second communication node and the core network node selected from the list of tunnels,
wherein the information associated with the tunnel between the second communication node and the core network node comprises at least one of: a unicast tunnel address of the second communication mode or a multicast tunnel address of the second communication node.

6. The method of claim 5, wherein the communication session comprises a Protocol Data Unit (PDU) session that is specific to a mobile device.

7. The method of claim 6, wherein the mobile device is dual-connected with the first communication node and the second communication node.

8. The method of claim 5, further comprising:
transmitting, by the core network node, data for the multicast and broadcast to the first communication node via the second communication node.

9. A communication apparatus, comprising:
processor electronics; and
a transceiver, wherein the transceiver is configured to receive a request from a core network node to establish a communication session, wherein the request comprises a list of tunnels established between the core network node and other communication nodes to provide multicast and broadcast service, wherein the processor electronics are configured to select a tunnel from the list of tunnels included in the request to establish a multicast and broadcast session that corresponds to the communication session, wherein each tunnel in the list of tunnels is identified by a dedicated tunnel identifier, wherein the transceiver is further configured to receive, from a second communication node, at least one of: a unicast tunnel address of the second communication node or a multicast tunnel address of the second communication node, wherein information associated with the tunnel between the second communication mode and the core network node comprises at least one of the unicast tunnel address of the second communication mode or the multicast tunnel address of the second communication node, and wherein the transceiver is further configured to transmit, to the core network node, a response indicating an establishment of the communication session, the response comprising the information associated with the tunnel between the second communication node and the core network node.

10. The communication apparatus of claim 9, wherein the communication session comprises a Protocol Data Unit (PDU) session that is specific to a mobile device.

11. The communication apparatus of claim 10, wherein the mobile device is dual-connected with the communication apparatus and the second communication node.

12. The communication apparatus of claim 9, wherein the transceiver is further configured to:

receive data for the multicast and broadcast session from the core network node via the second communication node.

13. A communication apparatus, comprising:
processor electronics; and
a transceiver that is configured to:
transmit a request to a first communication node to establish a communication session, wherein the request comprises a list of tunnels established between the communication apparatus and other communication nodes to provide multicast and broadcast service, wherein each tunnel in the list of tunnels is identified by a dedicated tunnel identifier, and receive a response indicating an establishment of the communication session, the response comprising information associated with a tunnel between a second communication node and the communication apparatus selected from the list of tunnels, wherein the information associated with the tunnel between the second communication node and the communication apparatus comprises at least one of: a unicast tunnel address of the second communication mode or a multicast tunnel address of the second communication node.

14. The communication apparatus of claim 13, wherein the communication session comprises a Protocol Data Unit (PDU) session that is specific to a mobile device.

15. The communication apparatus of claim 14, wherein the mobile device is dual-connected with the first communication node and the second communication node.

16. The communication apparatus of claim 13, wherein the transceiver is further configured to:
transmit data for the multicast and broadcast to the first communication node via the second communication node.

* * * * *